Figure 1:
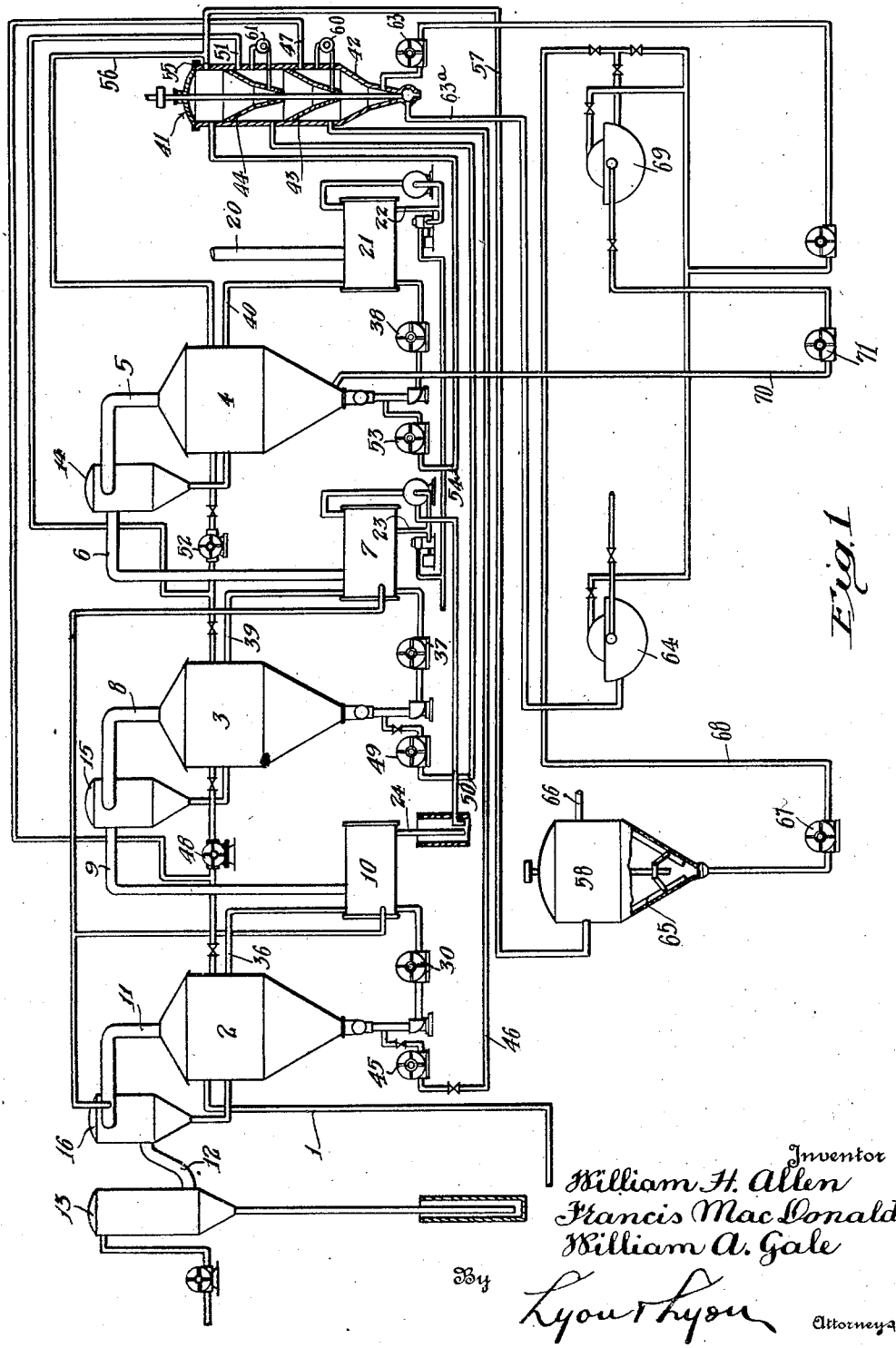

Patented Aug. 23, 1932

1,873,251

UNITED STATES PATENT OFFICE

WILLIAM H. ALLEN, FRANCIS MACDONALD, AND WILLIAM A. GALE, OF TRONA, CALIFORNIA, ASSIGNORS TO AMERICAN POTASH & CHEMICAL CORPORATION, OF TRONA, CALIFORNIA, A CORPORATION OF DELAWARE

METHOD AND APPARATUS FOR SEPARATING SALTS AND LIQUORS

Application filed September 26, 1928. Serial No. 308,496.

This invention relates to a method and apparatus for separating salts and liquors and refers particularly to a method and apparatus for separating certain sodium salts in the process of evaporating brines, such as are found in Searles or Owens Lake, said brines containing sodium chloride, sodium sulfate, sodium carbonate, potassium chloride and sodium borates.

In the evaporation of brines, such as are found in Searles and Owens Lakes, certain constituents of the brines are crystallized out during the heating and evaporation. The problem of the removal of these crystals from the system without attendant loss of heat and concentrated liquor is difficult particularly where evaporation is rapid and crystals are continuously being produced in large quantities. Allowing the salt to settle into containers which, when full, are cut off from the system and emptied, requires large equipment if large capacity is required.

To discharge the salt without fully recovering the hot concentrated liquor accompanying it, means loss of this liquor and the sensible heat of the salt and liquor from the system. These losses are serious where concentrations and temperatures are high.

An object of the present invention is to provide a method and apparatus for continuously removing salts from an evaporator system without attendant loss of heat and concentrated liquor.

In the evaporation of brines, such as are found in Searles or Owens Lakes, at elevated temperatures there is first precipitated or crystallized from the brine the sodium carbonates and sodium chloride. These constituents are of considerable value and it is desirable that such carbonates be to an extent separated from the sodium chloride during the simultaneous operations of evaporating, precipitating and settling these salts from the mother liquor. By the term "the sodium carbonates" we mean both the pure sodium carbonate separating from the brine as well as any mixed crystals of sodium carbonate and sodium sulfate. The sodium carbonates, i. e. the pure salt and the mixed crystals, are similar in thermodynamic behavior and are precipitated by the process as crystals of like size.

A further object of the present invention is therefore to provide a method for simultaneously settling and separating different salts from the mother liquor, and a specific object of the invention is to provide a method and apparatus by means of which the sodium carbonates which have been precipitated from brines, such as are found in Searles or Owen Lake, may be settled from the motor liquor in such manner as to be separated to a substantial extent from the sodium chloride, simultaneously precipitated.

Various further objects and advantages of the present invention will be understood from a description of a preferred form or example of a method and apparatus for continuously settling, separating and discharging salts embodying the present invention. For this purpose, there is hereinafter described with reference to the accompanying drawings the preferred form of a method and apparatus.

In the drawings:—

Figure 2:
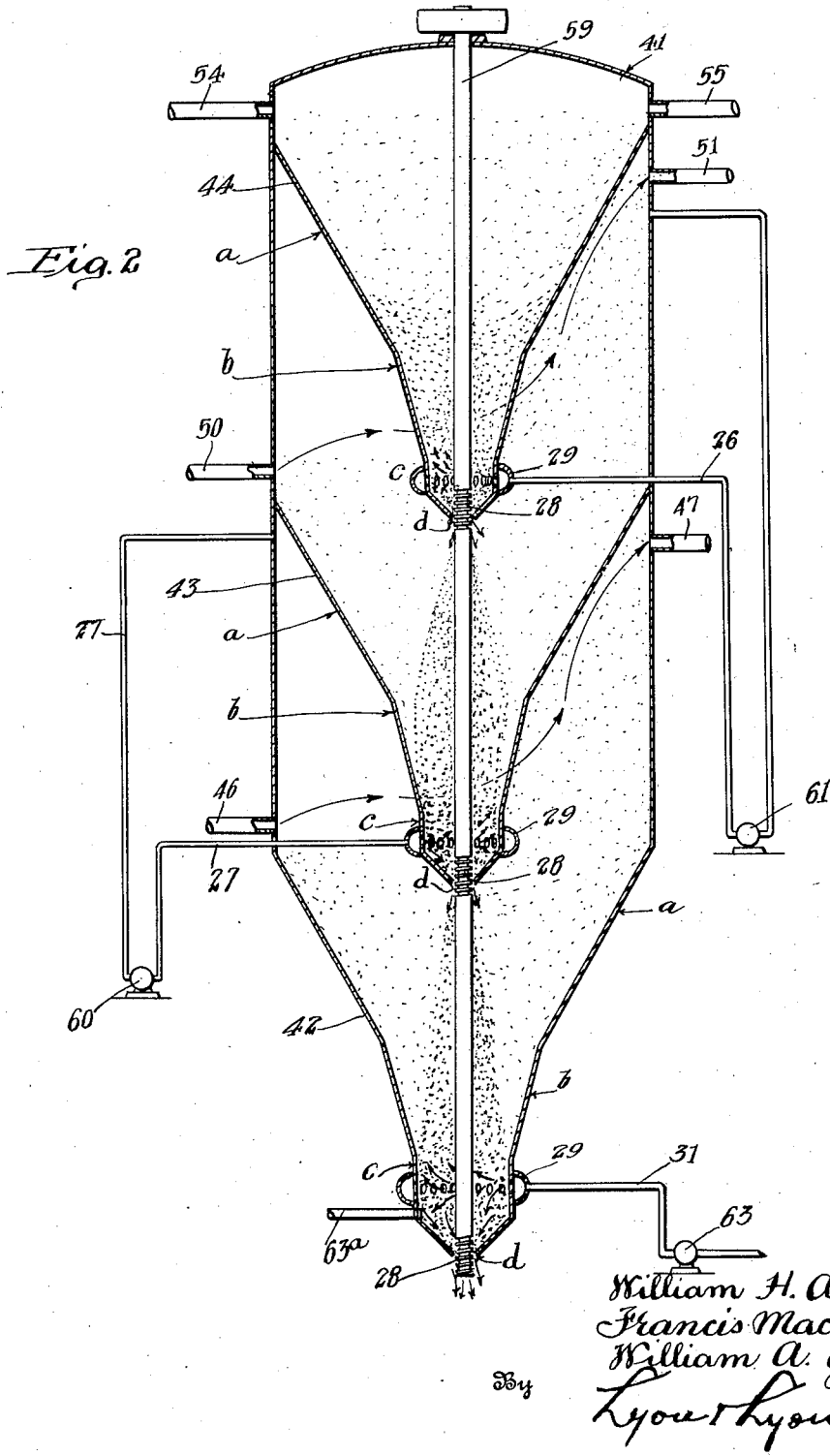

Figure 1 represents a diagram of an apparatus in elevation, embodying the present invention and in which the process of the present invention may be carried out; and Figure 2 is an enlarged elevation in vertical section of a salt settler and separator utilized in said apparatus.

Referring to the drawings, 1 indicates a line leading from a source (not shown) of brine to be processed, said line leading to an evaporator 2. While any number of evaporator effects may be employed in the method and apparatus of the present invention, the preferred form of the invention utilizes a triple effect evaporator system, of which 2 is the third effect, 3 the second effect, and 4 the first effect. In the multiple effect evaporator formed by the effects, 2, 3 and 4, the brine is caused to flow or caused to pass countercurrent to steam. The steam for the first effect 4 of the multiple effect evaporator enters a line 20 and passes into a heat exchanger 21, condensate being withdrawn thru line 22. The steam for the second effect evaporator is provided by the steam vaporized from the brine in the first effect 4. The steam from said brine passes out a vapor line 5 through a trap 14 which catches any entrained brine and thence passes through a line 6 to a heat exchanger 7, condensate being withdrawn through line 23. Similarly the steam for the third effect of the multiple effect evaporator system is provided by vapors from the brine in the second effect 3, said vapors passing through line 8, trap 15 and line 9 to a heat exchanger 10 from which the condensate is withdrawn through a line 24 to a condensate sump. The third effect of the evaporator is indicated as provided with a line 11 leading to a trap 16 from which the vapors are passed through a line 12, to a barometric condenser 13.

Each of the effects of the multiple effect evaporator may be operated at respectively lower pressures in accordance with well-known practice.

The brine is passed through the multiple effect evaporator in a reverse manner to the passage of the steam, i. e., the brine passing first to the third effect 2, hence to the second effect 3 and finally to the first effect 4, where evaporation is conducted at an elevated temperature. In each of the effects of the evaporator the brine is heated by being withdrawn from the evaporator through suitable lines and pumps 30, 37 and 38 and circulated through the heat exchangers 10, 7 and 21, respectively, and hence introduced through the lines 36, 39 and 40 again into the evaporator pans 2, 3 and 4 respectively. The specific features of the construction of the multiple effect evaporating apparatus and process are those described and claimed in a copending application, and the present invention is not directed to the details of the evaporator construction per se. Each of the effects of the evaporator system is provided with a draw-off line for the brine and salt crystals formed in the evaporator, there being indicated the lines 46, 50 and 54 fitted with pumps 45, 49 and 53, for the respective effects 2, 3 and 4. Each of said lines leads to a salt settling member or cone of salt trap 41. 42, 43 and 44 indicate the members or cones respectively connected with the evaporator effects 2, 3 and 4. Each of the cones is provided with an over-flow line by means of which the brine in such cone may be withdrawn. The cone 42 is indicated as provided with an overflow line 47 by means of which the brine may be returned to pan 2 or transferred forward by pump 48 to pan 3. The cone 43 is indicated as provided with an overflow line 51, by means of which the brine overflowing from this cone may be returned to pan 3 or transferred forward by pump 52 to pan 4.

The cone 44 is indicated as provided with an overflow line 55, split to return a part of the brine thru line 56 to pan 4, and to deliver a portion thru line 57 to settler 58.

As best illustrated in Figure 2 of the drawings, the several separating members 42, 43 and 44 are preferably formed into a composite salt trap 41, in which the separating member or cone 42 forms the bottom, and the separating member 43 is set over the member 42 and forms the top therefor, and the separating member 44 in turn is superimposed over the member 43 and encloses the top thereof, the top of the separating member or cone 44 being closed as indicated. The upper parts $a$ of each of the cone bottoms of the separating members 42, 43 and 44 preferably are dispsed at an angle of about 60° with the horizontal, and the central portions $b$ of the cone bottoms of the separating members are formed at an angle of approximately 75° with the horizontal, while at the bottoms $c$ of each of the separating members there is a short cylindrical section of relatively small diameter above an orifice $d$ at the bottom of the separating members. Through the axis of the salt trap running through each of the settling members is provided a shaft 59 which forms a means for assisting the discharge of salt in the conical ends of the traps. This shaft is provided, where it passes through the orifices $d$ of each settling member, with a helical screw section 28 of a diameter almost equal to that of the orifice.

The cylindrical sections $c$ of the separating members are indicated as provided with a series of circumferential perforations or openings of small diameter and said perforations are enclosed by casings 29 which form therearound an annular space, said annular space being connected with a line leading from a pump. The aforementioned casing 29 of the upper settling member 44 connects with a line 26 and pump 61 which takes suction near the top of the succeeding lower settling member 43. The casing of the central settling member 43 connects with a line 27 and pump 60 which takes suction from the lower settling member 42. The casing of the lower settling member or cone 42 is connected by the line 31 and pump 63 with a source of raw brine for the process and apparatus.

The overflow lines 55 and 57, Figure 1, from the upper salt settling member 44 are indicated as passing to a clarifier or settler 58 for settling fine salts. Said settler is indicated as provided with scraper blades 65 for preventing an accumulation of salt on the sides of the clarifier 58 from which a sludge of said salts may be withdrawn from the bottom of said settler by a pump 67 and passed through line 68 to a filter 69 which may be of the well known revolving type. 71 and 70 indicate a pump and a line for passing brine from said filter back into the first effect 4 of the evaporator.

The clarifier or fine salt settler 58 is indicated as provided with an overflow line 66 by means of which the clear hot concentrated liquor from the settler may be passed from the system for the recovery of further salts if desired.

The salt discharged from the bottom of the trap 41 is likewise passed through a line 63a to a revolving filter 64 where the course salts are filtered from the raw brine.

With the apparatus thus described the preferred process of settling and separating the salts is as follows: The brine fed to the process is preferably that which is found in Searles Lake and ordinarily possesses substantially the following analysis:

|   | Per cent |
|---|---|
| NaCl | 16.5 |
| $Na_2SO_4$ | 6.8 |
| KCl | 4.8 |
| $Na_2CO_3$ | 4.8 |
| $Na_2B_4O_7$ | 1.5 |

In practical operation the concentrated liquor from the process herein described is recycled to the evaporators after removal of certain potash and borax salts; so that the brine fed into the evaporator effect 2 from line 1 may have an analysis substantially as follows:

|   | Per cent |
|---|---|
| NaCl | 14.7 |
| $Na_2SO_4$ | 5.7 |
| KCl | 6.4 |
| $Na_2CO_3$ | 5.7 |
| $Na_2B_4O_7$ | 2.3 |

In the effects 2, 3 and 4 of the evaporator the brine is respectively heated to temperatures suitable for evaporating the brine and precipitating sodium chloride and the sodium carbonates. The evaporation is conducted to eliminate as much of the salts and water as can be conveniently effected without precipitation of the potash and borate constituents of the brine. For example, the solution is successively concentrated in the evaporators at temperatures of 50°, 77° and 110° C. and at pressures for example, of 2.05, 7.60 and 28.7 inches of mercury absolute.

These figures are given merely as illustrations of suitable conditions.

It is one object of the present invention to provide a method and apparatus for evaporating such brines as herein described whereby certain sodium salts may be precipitated in differential crystal size and simultaneously separated one from the other and to return fine crystals of sodium chloride to the evaporator system for further growth. Specifically the process and apparatus of this invention produces from Searles Lake or similar brine, sodium chlorid in crystals of large size and the sodium carbonates as crystals of relatively small size.

A relatively dilute sludge of concentrated brine and salt crystals is drawn off the bottoms of the several pans simultaneously and fed continuously to the indicated members of the multicone trap 41. Within these cones the brine flows across to outlet pipes 47, 51 and 55.

The volume of brine sent to the various cones is so adjusted that the major portion of the large sodium chlorid crystals is allowed to settle downward into the lower portions of the conical members. The greater part of the finer crystals of the sodium carbonates remains suspended in the brine and is returned to the evaporator system.

To obtain the desired differential settling we find it necessary to circulate large quantities of thin sludge from the lower portions of the evaporator pans over the several members of the multicone trap 41. In practice a sludge containing approximately 5% suspended solids is maintained within the pans of the evaporators.

The partially clarified brine leaving the several members of the multicone trap by lines 47, 51 and 55 returns for the most part to the pan from whence it was taken. However, in order to maintain a constant level within the pans it is necessary to transfer forward by means of pumps 48 and 52 a portion of the returning, partially clarified brine. The ratio of brine transferred forward to that returned from cones 42, 43 and 44 to pans 2, 3 and 4 respectively is small, say 10%.

The lower extremity of each conical member is provided with a circular orifice $d$ of such size as to allow free passage of a thickened sludge containing for the most part, 30–50% by weight of large sodium chlorid crystals.

The rotating helical screws 28 of large pitch serve to forcibly eject any hard lumps of salt that may accumulate in the system, and to insure a positive discharge of salt in the contingency of certain operating errors, resulting in an excessively thick sludge at these points.

The thickened sludge of the upper member 44 is counter-washed with brine of lesser concentration value and heat content by means of the pump 61, line 26 and distributor 29. In practice just sufficient brine is taken from the central member 43 and introduced above the orifice of member 44 to completely displace the original brine associated with the sludge. The resulting sludge consisting of coarse salt crystals and brine from member 43 passes thru the orifice and is discharged into member 43.

The process is repeated in member 43, the salt accumulating in the extremity of this cone consisting of that settled from the sludge introduced thru line 50 and the counter-washed salt which passed thru the orifice of the preceding member. The combined salts are counterwashed by means of pump 60 and line 27 and pass thru a suitable orifice $d$ into the succeeding cone.

In the bottom cone 42 the accumulated salts are thoroughly counterwashed with raw brine to displace all adhering liquor containing heat and concentration values.

This thorough counterwashing with clear raw brine serves to elutriate any fine crystals of the sodium carbonates that may be associated with the sludge. Thus the sludge emerging from the orifice of the lowest cone 42 and passing via line 63a to filter 64, consists essentially of a mixture of coarse sodium chlorid crystals and raw brine.

In practice a small quantity of brine containing concentration and heat values remains with the sludge so withdrawn and sent to the filter. The coarse salt crystals are separated from the brine and the resulting filter cake given a slight displacing wash with a further quantity of raw brine to recover the concentration and heat values therein contained. Brine removed by the filter may be returned to the evaporator system. The cake discharged from the filter consists essentially of sodium chlorid, in many cases suitable for various arts as obtained. It may be further refined for the production of chemically pure sodium chlorid suitable for table use or for the production of electrolytic caustic soda.

It must be understood that the size of the circular orifices of the several members are of increasingly larger diameters; their sizes being dependent upon the quantity and quality of sludge being handled. The preferred form of the apparatus is so constructed as to afford easy access to these orifices; the helical screw and orifices themselves being so installed as to make alterations a simple matter.

In the preferred form of the apparatus of this invention in the case of counterwashing pumps 60, 61 and 63 we prefer to utilize pumps which deliver brine in a positive manner. These pumps are fitted with means for obtaining variable driving speeds, so that the quantity of brine delivered to the annular rings 29, may be accurately controlled. While this is the preferred type of apparatus, it must be understood that the common type of centrifugal pumps fitted with devices for indicating and controlling the flow of brine is also satisfactory.

By the process and apparatus of this invention fine crystals of the sodium carbonates are prevented from being discharged from the bottom of the trap 41. Hence these fine crystals are carried forward through the several effects of the multiple effect evaporator, appearing in greatest concentration, in the first effect pan 4. In this pan, according to general practice, the brine is evaporated at high temperatures to the point of saturation with potassium chlorid, the concentration of the sodium borates likewise being high. These constituents are considered the most valuable of all those contained in Searles Lake or similar brines. Hence it is paramount that the method and apparatus employed for removing and separating the several sodium salts being precipitated from the liquors of the evaporator system be likewise efficient for preventing the loss of the concentrated liquors containing these valuable constituents, borax and potash. The herein described method and apparatus fulfills these conditions quite satisfactorily.

Brine so concentrated is suitable for the successful recovery of potassium chlorid and borax. A small proportion of the hot concentrated brine leaving the member 44 serving the first effect evaporator, is diverted through a line 57 into a settler 58. This settler is so constructed as to insure complete subsidence of the fine crystals of the sodium carbonates from the brine. Completely settled or clarified liquor passes out of the settler by line 66 to other processes and apparatuses suited to the desired end.

The sludge of fine crystals is caused to thicken in the bottom of the settler, and is delivered to the filter 69. In the preferred form of this invention we employ a filter of the well known rotary vacuum type so suited to the handling of large quantities of salts. Because of the high temperature and concentration of the liquor accompanying the sludge it is preferable to dilute the sludge to a slight extent with cold raw brine in the bowl of the filter. By this means flashing or evaporation within the integral parts of the filter is circumvented and the concentration and heat values retained in the filter cake are lessened. The filter cake is given a thorough washing with raw brine for the final displacement of the aforementioned values, the filtrate returning to the evaporator system via pump 71 and line 70, Figure 1.

At their inception the crystals of sodium chlorid may be of small dimensions. The process and apparatus of this invention continuously returns such crystals to the evaporator system, where they may be enlarged to a suitable differential size. The greater portion of the sodium chlorid content of such brines is precipitated during evaporation in the third and second effect pans of a triple effect counter-current evaporator system. By virtue of this fact combined with the high rate of circulation maintained through the salt trap, very few fine crystals of sodium chlorid are carried into the settler. As a result, a high grade crop of the sodium carbonates is assured in settler 58 and on filter 69.

By the process and apparatus of this invention the cake discharged from the filter consists essentially of the sodium carbonates, substantially free of sodium chlorid crystals. The sodium carbonates so obtained may be utilized directly in many of the arts, such as paper and glass manufacture. The filter cake may be further refined for the production of salt cake, soda ash, baking soda, caustic soda and related products.

In the operation of the multicone salt trap of this invention it is necessary to maintain a constant differential pressure head between the several superimposed members; for example, between a point at the orifice $d$ of conical member 44 and the succeeding member 43.

Suitable pressure difference must be maintained throughout the trap in order to insure a positive flow downward from each orifice to the succeeding conical member. The pumps 45, 49 and 53 are so selected as to provide the necessary pressure within the respective members 42, 43 and 44. Discharge lines 47, 51 and 55 may be fitted with suitable valves for adjusting the pressures as desired within the respective conical members. Each member may be fitted with suitable pressure gages (not shown) to indicate the pressures or differential pressures within the trap. Other suitable control devices such as thermometers etc. may be inserted within the multicone trap 41, to facilitate control.

While the preferred example of this invention utilizes three superimposed salt settling members in connection with a triple effect evaporator system, it is obvious that the number of such members may be increased or decreased to correspond with the number of effects employed in the multiple effect evaporator.

While the process herein described is adapted to effect a separation of salts from each other at the time they are separated from the concentrated brine, so that the separated salts are of greater value, the concentrated brine of the process may be and generally is of greater value than the salts such as the sodium carbonates and chlorid precipitated. The process is of great value in concentrating brines and may be economically used even where the sodium carbonates and chlorid are discarded as waste products.

While the process as herein described is well adapted to carry out the objects of the present invention, it is understood that various modifications and changes may be made without departing from the principles of the invention, and this invention includes all such modifications and changes as come within the scope of the following appended claims.

We claim:

1. An apparatus for separating solids from a mother liquor, which comprises a plurality of superimposed settling chambers, means for introducing a mother liquor and accompanying solids into each of said settling chambers, means for withdrawing overflow liquor from each of said chambers, an orifice for each of said chambers for withdrawing solid material therefrom, the orifices of the upper chamber discharging into the lower chambers, and elutriating means at said orifices for displacing the mother liquor from the discharged solids.

2. An apparatus for separating solids from a mother liquor, which comprises a plurality of superimposed settling chambers, means for introducing a mother liquor and accompanying solids into each of said settling chambers, means for withdrawing overflow liquor from each of said chambers, an orifice for each of said chambers for withdrawing solid material therefrom, the orifices of the upper chambers discharging into the lower chambers, elutriating means at said orifices for displacing the mother liquor from the discharged solids, and means at said orifices for forcibly ejecting solid materials.

3. An apparatus for separating solids from a mother liquor, which comprises a plurality of superimposed settling chambers, means for introducing a mother liquor and accompanying solids into each of said settling chambers, means for withdrawing overflow liquor from each of said chambers, an orifice for each of said chambers for withdrawing solid material therefrom, the orifices of the upper chambers discharging into the lower chambers, and elutriating means at said orifices for displacing the mother liquor from the discharged solids, the means for displacing the mother liquor at the orifices of the upper chambers being provided with means for utilizing the mother liquor of the lower chambers in said displacing operations.

4. An apparatus for separating solids from a mother liquor, which comprises a plurality of superimposed settling chambers, means for introducing a mother liquor and solids into each of said settling chambers, means for withdrawing overflow liquor from each of said chambers, orifices for withdrawing solid material from said chambers, the orifices of the upper chambers discharging into the lower chambers, means at said orifices for ejecting the solid materials, and elutriating means at said orifices for displacing the mother liquor from the ejected solid material, said means in case of the upper orifices utilizing the mother liquor of the succeeding lower chambers.

5. An apparatus for separating solids from a mother liquor, which comprises an evaporator, means for withdrawing mother liquor and accompanying solids from said evaporator and introducing the same into a settling chamber, said settling chamber, means for withdrawing overflow mother liquor from said chamber, an orifice for withdrawing solid material from said chamber, solid ejecting means operating in said orifice, and elutriating means at said orifice for displacing the mother liquor from the discharged solids.

6. The combination with a multiple effect evaporator, of a separator comprising a settling chamber for each of the effects of said evaporator, said settling chambers being superimposed, means for introducing the mother liquor of each effect of said evaporator to a settling chamber of said separator, so that successively more concentrated liquors from said effects are introduced in successively higher settling chambers of said separator, means for withdrawing overflow liquor from said settling chambers, orifices for said settling chambers for discharging solids, the orifices of the upper settling chambers discharging into the lower settling chambers, and elutriating means at said orifices for displacing the mother liquor from the discharged solids.

7. The combination with a multiple effect evaporator, of a separator comprising a settling chamber for each of the effects of said evaporator, said settling chambers being superimposed, means for introducing the mother liquor of each effect of said evaporator to a settling chamber of said separator, so that successively more concentrated liquors from said effects are introduced in successively higher settling chambers of said separator, means for withdrawing overflow liquor from said settling chambers, orifices for said settling chambers for discharging solids, the orifices of the upper settling chambers discharging into the lower settling chambers, elutriating means at said orifices for displacing the mother liquor from the discharged solids, and means for introducing the overflow liquor from the lower settling chambers into succeeding evaporator effects.

8. The combination with a multiple effect evaporator concentrating liquor to successively higher concentrations and transporting solids, of a separator comprising a settling chamber for each of the effects of said evaporator, means for introducing mother liquor from each effect of the evaporator to a settling chamber, means for withdrawing overflow liquor from said settling chambers, orifices for said settling chambers for withdrawing solids, and elutriating means at said orifices for displacing the mother liquor from the withdrawn solids, said means at the orifices of the settling chambers receiving the higher concentrated liquor being connected to for a displacement by the liquor at the succeeding lower stage of concentration.

9. The combination with a multiple effect evaporator, the different effects of which produce liquors of different concentration and accompanied by precipitated solids, of a separator comprising a plurality of settling chambers, means for introducing the liquor and accompanying solids from said evaporator effects into said settling chambers, means for withdrawing overflow liquor from said settling chambers and passing the same into succeeding evaporator effects, orifices for withdrawing solids from said settling chambers, solid ejecting means operating at said orifices, elutriating means at said orifices for displacing the mother liquor from the discharged solids by the liquor at the succeeding lower stage of concentration.

10. The combination with a multiple effect evaporator, the different effects of which produce liquors of different concentration and accompanied by precipitated solids, of a separator comprising a plurality of settling chambers, means for introducing the liquor and accompanying solids from said evaporator effects into said settling chambers, means for withdrawing overflow liquors from said settling chambers and passing the same into succeeding evaporator effects, orifices for withdrawing solids from said settling chambers, solid ejecting means operating at said orifices, elutriating means at said orifices for displacing the mother liquor from the discharged solids by the liquor at the succeeding lower stage of concentration, the settling chambers being superimposed and having their discharge orifices discharging into the successive lower settling chambers.

11. A salt separating apparatus comprising an outer shell, a plurality of spaced apart inverted conical bottoms for said shell having discharge orifices at their lower ends, solid ejecting means in said discharge orifices, means for introducing fluid adjacent to said discharge orifices for displacing liquor from solids discharged therethrough, means for introducing liquor above each conical bottom, and an overflow discharge outlet for each conical bottom.

12. A method for separating solids from mother liquor which comprises continuously passing the mother liquor and the accompanying solids into a settling zone, therein continuously causing the mother liquor to overflow from the settling zone, therefrom continuously forcibly ejecting solids, and continuously displacing the mother liquor from said solids as and at the point that said solids are withdrawn from said settling zone.

13. A method of separating solids from mother liquors at progressively higher stages of concentration which comprises continuously passing the different mother liquors and solids into separate settling zones, continuously causing the mother liquors to overflow in the settling zones, continuously ejecting from each settling zone solids, and continuously displacing the mother liquor from the solids as and at the point said solids are withdrawn from said settling zones by mother liquor of the succeeding lower stage of concentration.

14. A method of separating solids from mother liquors at succeeding higher stages of concentration which comprises continuously passing the mother liquors to separate settling zones, continuously causing the mother liquors to overflow in the settling zones, continuously ejecting from the settling zones solids, said solids from the mother liquors of the higher concentration being passed into the settling zones receiving the mother liquors of succeeding lower stages of concentration, and displacing the mother liquor from the discharging solids as and at the point at which said solids are withdrawn from said settling zones.

15. A method of separating solids from mother liquors at succeeding higher stages of concentration which comprises continuously passing the mother liquors to separate settling zones, continuously causing the mother liquors to overflow in the settling zones, continuously ejecting from the settling zones solids, said solids from the mother liquors of the higher concentration being passed into the settling zones receiving the mother liquors of succeeding lower stages of concentration, and displacing the mother liquor from the discharging solids as and at the point at which said solids are withdrawn from said settling zones, the mother liquors at succeeding lower stages of concentration being utilized as the displacing liquors at the orifices of the settling zones receiving the mother liquors of succeeding higher stages of concentration.

16. A method of separating solids from liquors which comprises passing the liquor to a plurality of evaporating zones in which the liquor is successively evaporated and caused to precipitate solids, passing the liquor and accompanying solids from said evaporating zones to settling zones wherein the liquors are caused to overflow and pass to the succeeding evaporating zones, separately withdrawing solids from said settling zones, and displacing the mother liquor from said withdrawn solids as and at the point said solids are withdrawn from said settling zones, the mother liquor of said solids being displaced by the liquor at a succeeding lower stage of concentration.

17. A process of separating sodium carbonates and sodium chlorid from brines which precipitate such salts on evaporation, which comprises continuously passing the brine through an evaporating zone in which said salts are precipitated, and continuously passing the brine with the precipitated salts through a separating zone in which the carbonates are, to a substantial extent, separated from the sodium chlorid by hydraulic classification.

18. A process of separating sodium carbonates and sodium chlorid from a brine containing such salts which precipitate on evaporation, which comprises continuously passing brine through an evaporating zone wherein the brine is evaporated under conditions to precipitate said salts, the carbonates being precipitated in relatively finer form than the sodium chlorid, and then continuously passing the brine and the accompanying salts to a settling zone in which the major portion of the sodium chlorid is permitted to settle and in which the brine is caused to overflow at a rate sufficient to carry out the majority of the carbonates.

19. A process of separating sodium carbonates and sodium chlorid from a brine containing such salts which precipitate on evaporation, which comprises continuously passing brine through an evaporating zone wherein the brine is evaporated under conditions to precipitate said salts, the carbonates being precipitated in relatively finer form than the sodium chlorid, then continuously passing the brine and the accompanying salts to a settling zone in which the major portion of the sodium chlorid is permitted to settle and in which the brine is caused to overflow at a rate sufficient to carry out the majority of the carbonates, continuously removing from said settling zone the settled salt and filtering the same from the accompanying liquid, and passing the overflowing brine and carbonate salts to a second settling zone operated so as to cause the carbonates to be continuously settled from the brine.

20. A process of separating sodium carbonates and sodium chlorid from a brine containing such salts which simultaneously precipitate upon evaporation of the brine, which comprises continuously passing the brine through an evaporating zone wherein the brine is evaporated under conditions to precipitate said salts, the carbonates being precipitated in relatively finer form than the sodium chlorid, then continuously passing the concentrated brine and accompanying salts through a settling zone through which the brine is passed at such a rate as to precipitate the majority of the sodium chlorid and to carry over to the overflow the majority of carbonates, and then passing the brine continuously through a further settling zone in which the liquor flows at such a rate as to cause precipitation of the majority of the carbonates.

21. A process of separating sodium carbonates and sodium chlorid from a brine containing such salts which simultaneously precipitate upon evaporation of the brine, which comprises continuously passing the brine through an evaporating zone wherein the brine is evaporated under conditions to precipitate said salts, the carbonates being precipitated in relatively finer form than the sodium chlorid, then continuously passing the concentrated brine and accompanying salts through a settling zone through which the brine is passed at such a rate as to settle the majority of sodium chlorid and to carry over to the overflow the majority of carbonates, and then passing the brine continuously through a further settling zone in which the liquor flows at such a rate as to cause settling of the majority of the carbonates, continuously withdrawing the salt sludges from said settling zones and filtering the salts from the sludges.

22. A process of separating sodium carbonate and sodium chlorid from brines containing such salts which precipitate on evaporation, which comprises passing the brine through successive evaporating zones in which the brine is successively evaporated under conditions to cause the salts to precipitate, the carbonates being precipitated in relatively finer form than the sodium chlorid, continuously passing the brine from each evaporating zone through a settling zone at such a rate as to cause the majority of the sodium chlorid to settle and to cause the majority of carbonates to be carried over with the overflowing brine, continuously passing the brine from such settling zones to the succeeding evaporating zones, continuously withdrawing the settled salt from said settling zones while displacing the liquor accompanying said salt as and at the point that they are withdrawn by brine at the succeeding lower stage of concentration, and passing the brine overflowing the final settling zone through a settling zone wherein it passes at such a rate as to settle out the majority of the carbonates.

23. A method of separating sodium carbonates and sodium chlorid from brine from which the carbonates and chlorides simultaneously precipitate on evaporation which comprises, evaporating the brine while precipitating the carbonates as fine salts and the chlorid as coarse salts, and separating the carbonates from the chlorides by hydraulic classification.

24. A process for separating sodium carbonates and sodium chlorid from brine which comprises, passing the brine into an evaporating system in which the brine is evaporated while the carbonates and chlorid are precipitated, and withdrawing a salt sludge from the evaporating zone, removing coarse salts, and returning the brine and fine salts to the evaporating system, wherein the returned fines of sodium chlorid are permitted to increase in crystal size whereby the chlorides are formed in the evaporating system as large crystals and the carbonates remain as small crystals.

25. A method of separating sodium carbonates and chlorides from brine which comprises, passing the brine into an evaporator in which the brine is evaporated to simultaneously precipitate the carbonates and chlorid, withdrawing brine from the evaporating zone and passing the brine to a settling zone wherein coarse salts of sodium chlorid are permitted to settle, subjecting the separating coarse salts to elutriation in such settling zone to free the coarse salts from fine salts, and returning the brine and fine salts to the evaporating zone.

26. A method for separating sodium carbonates and sodium chlorid from brine containing such salts which precipitate on evaporation, which comprises passing such brine into an evaporating zone, circulating brine and salt sludge from the evaporating zone through a settling zone and back into the evaporating zone, passing the brine to the settling zone at a rate suitable for causing large sodium chlorid crystals to settle out and the brine carrying sodium carbonate to overflow, withdrawing the coarse salts from the settling zone, and subjecting the coarse salts to elutriation as they are withdrawn for removing fine salts therefrom.

27. A process of separating solids from brine which comprises, passing the brine to successive evaporating zones in which the brine is successively evaporated under conditions to cause salts to precipitate, passing the brine from said evaporating zones to settling zones to cause a portion at least of the salts to be separated from the brine, and returning the brine from the settling zone partially to the evaporating zone from which it was taken and partially to the succeeding evaporating zone, the amount of brine returned to the evaporating zone being greater than that transferred to the succeeding evaporating zone.

Signed at Trona, California, this 17th day of September, 1928.

WILLIAM H. ALLEN.
FRANCIS MACDONALD.
WILLIAM A. GALE.